(12) United States Patent
Mizutani et al.

(10) Patent No.: US 6,785,003 B2
(45) Date of Patent: Aug. 31, 2004

(54) RING LASER GYRO WITH OPTICALLY INDEPENDENT SEMICONDUCTOR RING LASERS

(75) Inventors: Natsuhiko Mizutani, Tokyo (JP); Takahiro Numai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 09/900,951

(22) Filed: Jul. 10, 2001

(65) Prior Publication Data
US 2002/0021447 A1 Feb. 21, 2002

(30) Foreign Application Priority Data

Jul. 12, 2000 (JP) .......................... 2000/211854

(51) Int. Cl.[7] .............................. G01C 19/68
(52) U.S. Cl. ................................... 356/461
(58) Field of Search ........................ 356/459, 461, 356/467; 372/94

(56) References Cited

U.S. PATENT DOCUMENTS 3,862,803 A * 1/1975 Yntema et al. ............ 356/467
4,431,308 A 2/1984 Mitsuhashi et al.
4,913,548 A 4/1990 Vick
5,764,681 A 6/1998 Ballantyne et al.

FOREIGN PATENT DOCUMENTS

| JP | 57-43486 | | 3/1982 |
| JP | 59041883 | * | 8/1984 |
| JP | 4-174317 | | 6/1992 |
| JP | 6-38529 | | 5/1994 |

* cited by examiner

Primary Examiner—Samuel A. Turner
(74) Attorney, Agent, or Firm—Fitzpatrick, Cella, Harper & Scinto (57) ABSTRACT

A semiconductor ring laser gyro comprising two or more ring lasers, the ring lasers being optically independent of each other, is characterized in that a change in beat frequency with respect to a change in angular velocity of a first ring laser is opposite to that of a second ring laser, and angular velocity of rotation of the gyro is detected by a signal representing a difference between a first beat frequency generated by the first ring laser and a second beat frequency generated by the second ring laser.

19 Claims, 6 Drawing Sheets

RING LASER GYRO WITH OPTICALLY INDEPENDENT SEMICONDUCTOR RING LASERS

BACKGROUND OF THE INVENTION

1. Field of the Invention

The present invention relates to a ring laser gyro for detecting rotation using a semiconductor ring laser.

2. Related Background Art

Conventionally, as gyros for detecting rotation, that is, angular velocity, of an object, mechanical gyros having a rotor and an oscillator, optical gyros, and the like are known. Since optical gyros can be instantaneously activated and have a wide dynamic range, they are making innovations in the field of gyros. Optical gyros can be categorized into ring laser gyros, optical fiber gyros, passive ring resonator gyros, and the like. Ring laser gyros using gas lasers have already been put into practical use in the field of airplanes. As small-sized ring laser gyros with high accuracy, gyros formed of semiconductor ring lasers have been proposed, which are disclosed in Japanese Patent Publication Nos. 62-39836, 6-38529 and Japanese Patent Application Laid-Open No. 4-174317.

A gyro formed of a semiconductor ring laser over a mechanical gyro having an oscillator are characterized by a smaller size, lower power consumption, and shortened activating time, which makes the gyro suitable for use as a gyro stabilizer in a still camera or a video camera for preventing blurred image due to movement of the camera.

In such a gyro, beat frequency has information on angular velocity. In order to detect the beat frequency, there is a method of converting the beat frequency to a voltage signal via a frequency-voltage conversion circuit, a method of directly detecting the beat frequency through a frequency counter, and the like.

SUMMARY OF THE INVENTION

However, a conventional gyro formed of a semiconductor ring laser can not detect the rotational direction from an output signal as it is. Therefore, minute rotational vibration (dithering) is added to detect the rotational direction from the correlation between the dithering and the signal. The Japanese Patent Publication No. 62-39836 and the Japanese Patent Application Laid-Open No. 4-174317 do not disclose the method of detecting the rotational direction.

A conventional ring laser gyro is required to improve the accuracy of detecting a beat signal.

In order to attain the above object, a ring laser gyro according to the present invention comprises at least one pair of semiconductor ring lasers, the semiconductor ring lasers being optically independent of each other and variation in a period of an impedance change in one of the pair being opposite to that in the other with respect to rotation in one direction. More specifically, a ring laser gyro comprising two or more semiconductor ring lasers, the semiconductor ring lasers being optically independent of each other, is characterized in that a change in beat frequency with respect to a change in angular velocity of a first ring laser is opposite to that of a second ring laser, and angular velocity of rotation of the gyro is detected by a signal representing a difference between a first beat frequency generated by the first ring laser and a second beat frequency generated by the second ring laser. In particular, the ring laser gyro is characterized in that the beat frequency generated by the first ring laser and the beat frequency generated by the second ring laser in a static state are equal to each other, and the rate of change in the beat frequency with respect to the change in the angular velocity of the first ring laser is equal to that of the second ring laser.

A ring laser gyro according to the present invention is provided with two semiconductor ring lasers, the semiconductor ring lasers being in planes nonperpendicular to each other, being optically independent of each other, and each being provided with an electric terminal for detecting an impedance change, a period of the impedance change between the terminals being varied according to applied angular velocity. When angular velocity in a direction is increased, frequency of the impedance change with respect to the first semiconductor ring laser is decreased, while frequency of the impedance change with respect to the second semiconductor ring laser is increased.

In the above structure, by carrying out signal processing with respect to a frequency change in the impedance change of the two semiconductor ring lasers, a signal which depends on the angular velocity can be separated from a change in the beat frequency in a static state and noises. The sign of variation in the signal which depends on the angular velocity of one semiconductor ring laser is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with accuracy from a signal which depends on the angular velocity.

According to the present invention, in the ring laser gyro, each of the two semiconductor ring lasers has two laser beams, the two laser beams rotating in opposite directions in their respective optical resonators and having different frequencies of oscillation in a static state. The relationship in magnitude between the frequency of oscillation of the clockwise laser beam and the frequency of oscillation of the counterclockwise laser beam is reversed between the two semiconductor ring lasers.

In the above structure, the two laser beams of each of the two semiconductor ring lasers rotate in opposite directions in their respective optical resonators and have different frequencies of oscillation in the static state generate optical beat. Further, since the two semiconductor ring lasers are optically independent of each other, when the gyro provided with them is rotated, the frequencies of oscillation of the respective laser beams vary independently of each other. Since the relationship in magnitude between the frequency of oscillation of the clockwise laser beam and the frequency of oscillation of the counterclockwise laser beam is reversed between the two semiconductor ring lasers, when the gyro is rotated, the optical beat frequency in the optical resonator of one semiconductor ring laser is increased while that of the other is decreased. This variation in the optical beat frequencies is detected as a frequency change in the impedance change between the terminals of the semiconductor ring lasers.

By carrying out signal processing with respect to the obtained frequency change, a signal which depends on the angular velocity can be separated from a change in the beat frequency in a static state and noises. The sign of variation in the signal which depends on the angular velocity of one semiconductor ring laser is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with accuracy from a signal which depends on the angular velocity.

Further, according to the present invention, in the ring laser gyro, the two semiconductor ring lasers have a tapered portion in a part of their respective optical waveguides. The tapered portion is formed of a first portion where the width of the optical waveguide becomes larger along a propagation direction of a clockwise laser beam and a second portion where the width of the optical waveguide becomes smaller. In the first semiconductor ring laser, the first portion is longer than the second portion, while, in the second semiconductor ring laser, the second portion is longer than the first portion.

Here, the tapered portions of the semiconductor ring lasers have structures introduced for the purpose of giving difference between the frequency of oscillation of the clockwise laser beam and the frequency of oscillation of the counterclockwise laser beam in the static state. Further, the relationship of which is longer between the first portion and the second portion of the tapered portion is reversed between the first and the second semiconductor ring lasers. This makes the dependence of resonator loss on the rotational direction reversed between the first and the second semiconductor ring lasers. Therefore, the relationship in magnitude between the frequency of oscillation of the clockwise laser beam and the frequency of oscillation of the counterclockwise laser beam is reversed.

Here, more specifically, the tapered portions function as follows. The laser beam in the optical resonator is propagated repeating total internal reflections at the interface of the optical waveguide. Since, at the tapered portion, the angle of incidence upon the interface of the optical waveguide does not satisfy the total internal reflection condition, waveguide loss is caused. Since the angle of incidence upon the interface at the tapered portion differs depending on the rotational direction, the loss also differs, i.e., the resonator loss depends on the rotational direction. The difference in the resonator loss makes a difference in the oscillation threshold value of the ring laser. When two laser beams of different rotational directions coexist and oscillate, the photon density differs. The difference in the photon density makes different the frequency of oscillation of the laser beam due to nonlinear effect.

Since, in each of the semiconductor ring laser, the frequency of oscillation of the clockwise laser beam and that of the counterclockwise laser beam differ, optical beat is generated. Further, since the two semiconductor ring lasers are optically independent of each other, when the gyro provided with them is rotated, the frequencies of oscillation of the respective laser beams vary independently of each other. Since the relationship in magnitude between the frequency of oscillation of the clockwise laser beam and the frequency of oscillation of the counterclockwise laser beam is reversed between the two semiconductor ring lasers, when the gyro is rotated, the optical beat frequency in the optical resonator of one semiconductor ring laser is increased while that of the other is decreased. This variation in the optical beat frequencies is detected as a frequency change in the impedance change between the terminals of the semiconductor ring lasers.

By carrying out signal processing with respect to the obtained frequency change, a signal which depends on the angular velocity can be separated from a change in the beat frequency in a static state and noises. The sign of variation in the signal which depends on the angular velocity of one semiconductor ring laser is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with accuracy from a signal which depends on the angular velocity.

According to the present invention, in the ring laser gyro, the ratio of the area surrounded by the resonator to the length of a revolution of the resonator in the first semiconductor ring laser is equal to that in the second semiconductor ring laser.

In the above structure, the ratio of the area surrounded by the resonator to the length of a revolution of the resonator in each of the semiconductor ring laser is a parameter which determines the absolute value of the amount of variation in the beat frequency with respect to the change in the angular velocity. When this parameter is the same between the two semiconductor ring lasers, the amounts of variation in the beat frequencies of the two semiconductor ring lasers have the same absolute value and the opposite polarities. Therefore, it becomes still easier to separate a signal which depends on the angular velocity from a change in the beat frequency in a static state and noises. The sign of variation in the signal which depends on the angular velocity of one semiconductor ring laser is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with more accuracy from a signal which depends on the angular velocity.

Further, in the ring laser gyro, the shapes of the resonators of the first and the second semiconductor ring lasers have mirror symmetry each other.

In the above structure, since the shapes of the resonators of the first and the second semiconductor ring lasers are mirror images of each other, the dependence of the resonator loss on the rotational direction is made to be symmetrical mirror image between the two semiconductor ring lasers. In other words, the rotational loss of the clockwise laser beam in the first semiconductor ring laser is the same as the rotational loss of the counterclockwise laser beam in the second semiconductor ring laser, and the rotational loss of the counterclockwise laser beam in the first semiconductor ring laser is the same as the rotational loss of the clockwise laser beam in the second semiconductor ring laser. It follows that, when the driving conditions are the same between the two semiconductor ring lasers, the beat frequency in the static state is also the same. The beat frequency in the static state is independent of the angular velocity during rotation. When the value is the same between the two semiconductor ring lasers, a signal component dependent on the angular velocity can be separated with high accuracy by carrying out subtraction between signals from the two semiconductor ring lasers. Since, by the subtraction between the two signals, a noise component independent of the angular velocity is also suppressed, the S/N ratio can be improved. As a result, the angular velocity and the rotational direction can be obtained with accuracy.

Further, according to the present invention, the optical laser gyro comprises an absorber or a light-shield for preventing optical coupling between the two semiconductor ring lasers, and the absorber or the light-shield is prevented from returning reflected light to the semiconductor ring lasers.

In the above structure, the absorber or a light-shield for preventing the optical coupling makes it possible for the respective semiconductor ring lasers to carry out laser oscillation optically independently of each other. Further, by preventing the absorber or the light-shield from returning reflected light to the semiconductor ring lasers, optical coupling between the clockwise laser beam and the counterclockwise laser beam is prevented to suppress lock-in.

When the gyro formed of the two optically independent semiconductor ring lasers structured in this way is rotated, the frequency of oscillation of the clockwise laser beam and the frequency of oscillation of the counterclockwise laser beam change independently from each other in each of the semiconductor ring laser. By carrying out signal processing with respect to them, the angular velocity can be obtained. Therefore, a ring laser gyro which operates with stability in a wide range of angular velocity can be realized.

Driving methods such as constant voltage drive and constant current drive make it possible to take out an impedance change of a device with a simple circuit structure, and connection to various signal processing circuits can be realized with ease. In a signal processing circuit, a signal which depends on the angular velocity can be separated from a change in the beat frequency in a static state and noises. The sign of variation in the signal which depends on the angular velocity of one semiconductor ring laser is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with accuracy from a signal which depends on the angular velocity.

Further, according to the present invention, in a method of driving a gyro, current injected to or voltage applied to the two semiconductor ring lasers is the same.

In the above structure, the same injected current and the applied voltage lead to small differences in the oscillation frequencies, the light intensities, and the generated heats between the first and the second semiconductor ring lasers, which result in the same beat frequency in the static state. This driving is particularly useful when there is mirror symmetry between the shapes of the two semiconductor ring lasers. By driving in this way, the beat frequency in the static state, which is independent of the angular velocity during rotation, becomes common in the respective semiconductor ring lasers. Therefore, a signal component dependent on the angular velocity and the beat frequency in the static state independent of the angular velocity can be separated with ease and with high accuracy, which makes it possible to improve the S/N ratio. As a result, the angular velocity and the rotational direction can be obtained with accuracy from a signal dependent on the angular velocity.

Further, according to the present invention, a signal processing is carried out with respect to the frequency of the impedance change in the two semiconductor ring lasers to obtain the angular velocity and the rotational direction.

In the above structure, the signal processing separates a signal dependent on the angular velocity and a beat frequency component in the static state, which is independent of the angular velocity.

Here, the signal, which depends on the angular velocity, is separated from a change in the beat frequency in the static state and noises. The sign of variation in the signal, which depends on the angular velocity of one semiconductor ring laser is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with more accuracy from a signal, which depends on the angular velocity.

Further, according to the present invention, a signal processing in the ring laser gyro is subtraction or negatively weighted average.

In the above structure, the difference in the frequencies of the impedance change obtained by the subtraction is in proportion to the angular velocity including the sign representing the rotational direction. This signal processing is particularly beneficial when the beat frequency is substantially the same between the two semiconductor ring lasers in the static state under the same driving conditions and the amounts of variation in the beat frequencies with respect to variation in the angular velocity of the two semiconductor ring lasers have the same absolute value and the opposite polarities.

By the negatively weighted average, a signal component due to the beat frequency in the static state, which is independent of the angular velocity, is canceled out and a signal in proportion to the angular velocity including the sign representing the rotational direction is obtained. This signal processing is particularly valuable when the beat frequencies in the static state of the two semiconductor ring lasers are not the same.

The weighting may be carried out as follows. Reciprocals of the frequencies of the impedance change in the static state of the two semiconductor ring lasers are respectively found, and one of the reciprocals multiplied by (−1) is used as the weight of the weighted average.

Here, the signal which, depends on the angular velocity, is separated from a change in the beat frequency in the static state and noises. The sign of variation in the signal, which depends on the angular velocity of one semiconductor ring laser, is opposite to that of the other semiconductor ring laser, while the sign of variation in the change in the beat frequency in a static state and the noises of one semiconductor ring laser is the same as that of the other semiconductor ring laser. In this way, the S/N ratio can be improved, and thus, the angular velocity and the rotational direction can be obtained with more accuracy from a signal which depends on the angular velocity.

Further, according to the present invention, the ring laser gyro is driven with respect to the frequencies of the impedance change in the respective semiconductor ring lasers, and the driving conditions are controlled by using the result of the signal processing on the frequencies of the impedance change.

In the above structure, the signal processing with respect to the frequencies of the impedance change in the respective semiconductor ring lasers separate a signal independent of the angular velocity. By controlling the driving conditions to stabilize the signal, which is independent of the angular velocity over time, a signal, which is dependent on the angular velocity is, separated with suppressing the change in the signal over time, leading to high accuracy of separation.

Further, according to the present invention, the driving method of the ring laser gyro is characterized in that the operation is addition or weighted average.

In the above structure, the addition or the weighted average separates a component independent of the angular velocity from a signal obtained from the respective semiconductor ring lasers. In particular, in the two semiconductor ring lasers, when the absolute values of the frequencies of the impedance change with respect to the angular velocity are the same and their signs are opposite, a component independent of the angular velocity is obtained by the addition. When, in the two semiconductor ring lasers, the absolute values of the frequencies in the impedance according to the angular velocity are not the same, the absolute values of the frequencies are differentiated with respect to the angular velocity, and the reciprocals of the results are used as the weight of the weighted average. By controlling the driving conditions to stabilize the signal obtained in this way, which is independent of the angular velocity over time, the change in the signal over time can be decreased, and thus, the accuracy can be improved when a signal dependent on the angular velocity is separated.

DETAILED DESCRIPTION OF THE PREFERRED EMBODIMENTS

Embodiment 1

Figure 1A:
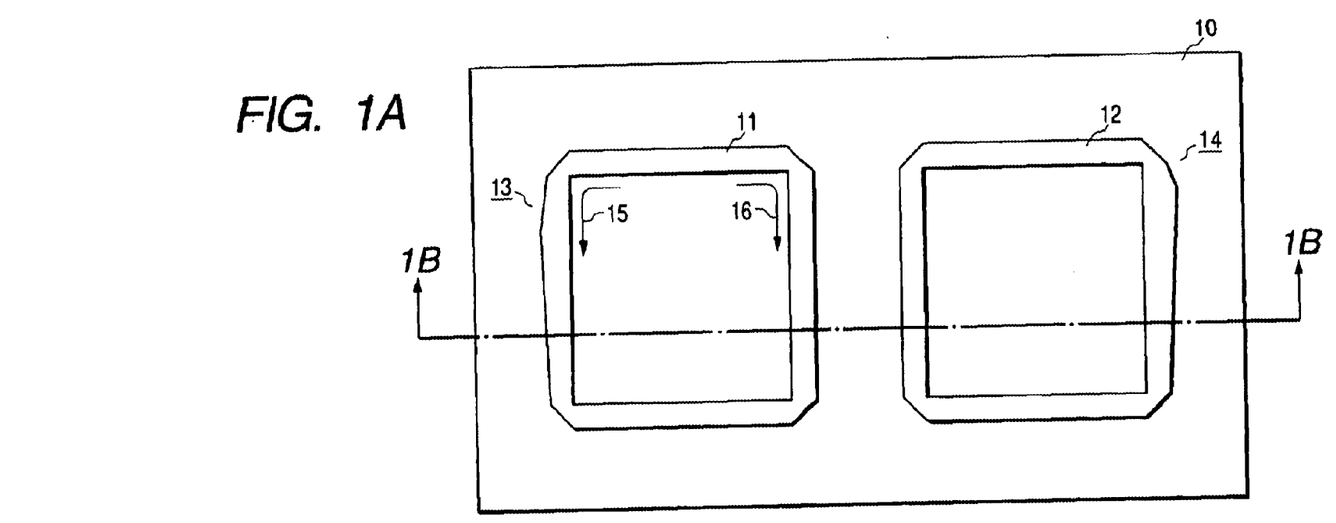
FIGS. 1A and 1B are a plan view and a cross-sectional view, respectively, of an optical gyro of Embodiment 1 according to the present invention.
Figure 1B:
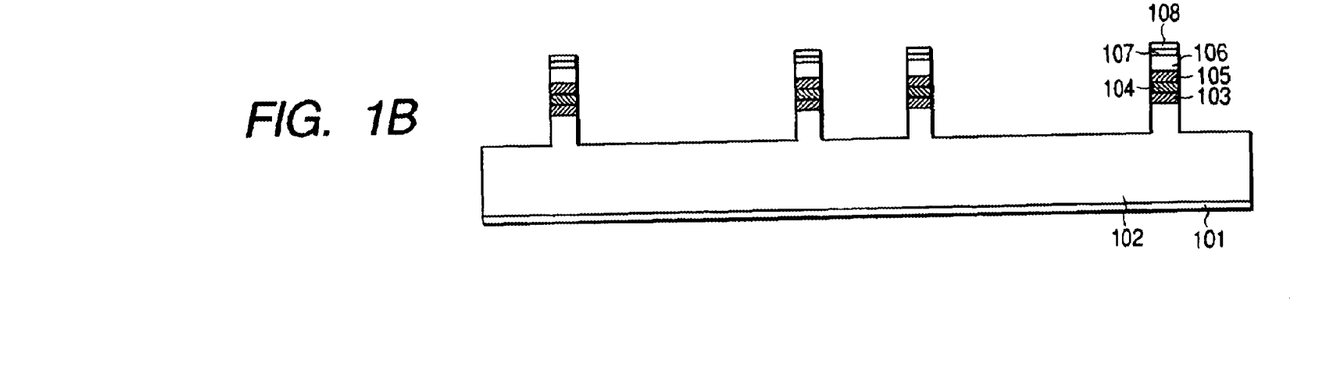

A first embodiment of an optical gyro according to the present invention is now described with reference to FIGS. 1A and 1B.

A reference numeral 10 denotes an optical gyro device according to the present invention. Reference numerals 11 and 12 denote semiconductor ring lasers and reference numerals 13 and 14 are portions (tapered portions) provided in parts of optical waveguides, where the width of the optical waveguides change. Each semiconductor ring laser has a counterclockwise propagation mode 15 and a clockwise propagation mode 16.

The two semiconductor ring lasers 11 and 12 are fabricated as follows. FIG. 1B is a cross-sectional view taken along the line 1B—1B in FIG. 1A. With reference to FIG. 1B, first, a semiconductor multilayer structure is formed by organic metal vapor deposition. More specifically, on an n-InP substrate 102, an undoped InGaAsP optical guiding layer with a band gap wavelength of 1.3 µm (a thickness of 0.15 µm), an undoped InGaAsP active layer 104 with a band gap wavelength of 1.55 µm (a thickness of 0.1 µm), an undoped InGaAsP optical guiding layer with a band gap wavelength of 1.3 µm (a thickness of 0.15 µm), a p-InP cladding layer 106 (a thickness of 1.5 µm), and a p-InGaAs cap layer 107 are formed by crystal growth. Then, photoresist is coated on the p-InGaAs cap layer 107, and is exposed by using a photomask. This photoresist is developed to transfer the mask pattern into the photoresist in the shape of ring resonators. By reactive ion etching using chlorine gas, the semiconductor ring lasers ridge waveguides of a height of 3 µm are formed. Then, Cr/Au is deposited over the ridge waveguides to be an anode 108. AuGe/Ni/Au is deposited on a lower side of a wafer to be a cathode 101. Annealing is carried out in a hydrogen atmosphere to make ohmic contacts.

The shapes of the optical waveguides forming the ring resonators are described in detail in the following. Both semiconductor ring lasers 11 and 12 are asymmetrical. That is, the tapered portion 13 (and 14) consists of a first portion where the width of the optical waveguide gradually becomes larger along a propagation direction of the counterclockwise (clockwise) laser beam and a second portion where the width of the optical waveguide gradually becomes smaller. The length of the first portion differs from that of the second portion. In particular, in the illustrated example, the first portion is extremely short. The shapes of the semiconductor ring lasers 11 and 12 have mirror symmetry each other.

With regard to arrangement of the semiconductor ring lasers 11 and 12 formed on the same substrate, they are placed so that their laser beams may not be coupled to each other. In order to avoid influence of evanescent light, the space between them is set to about 15 µm or more. Since, at the asymmetrical tapered portions, laser lights emitted to the outside of the optical waveguides exist as a result of mode conversion, the tapered portions are placed so as not to face to face each other or not to be in a line. Alternatively, an absorber may be formed between the semiconductor ring lasers by leaving the semiconductor layers unetched. Further, a light-shield may be formed by coating an insulating film and an electrode metal on side surfaces and an upper surface of the absorber. Further, a light-shield may be formed by an insulating film coated on side surfaces of the device and an electrode metal placed thereon. These kinds of light-shields are tilted so that light reflected the surface of the light-shield is not returned to the semiconductor ring lasers. Such an arrangement of the device, an absorber, or a light-shield decreases interaction between the semiconductor ring lasers to make them optically independent of each other. Further, the clockwise laser beam and the counterclockwise laser beam are prevented from being optically coupled to each other by reflected light to suppress lock-in.

Figure 2:
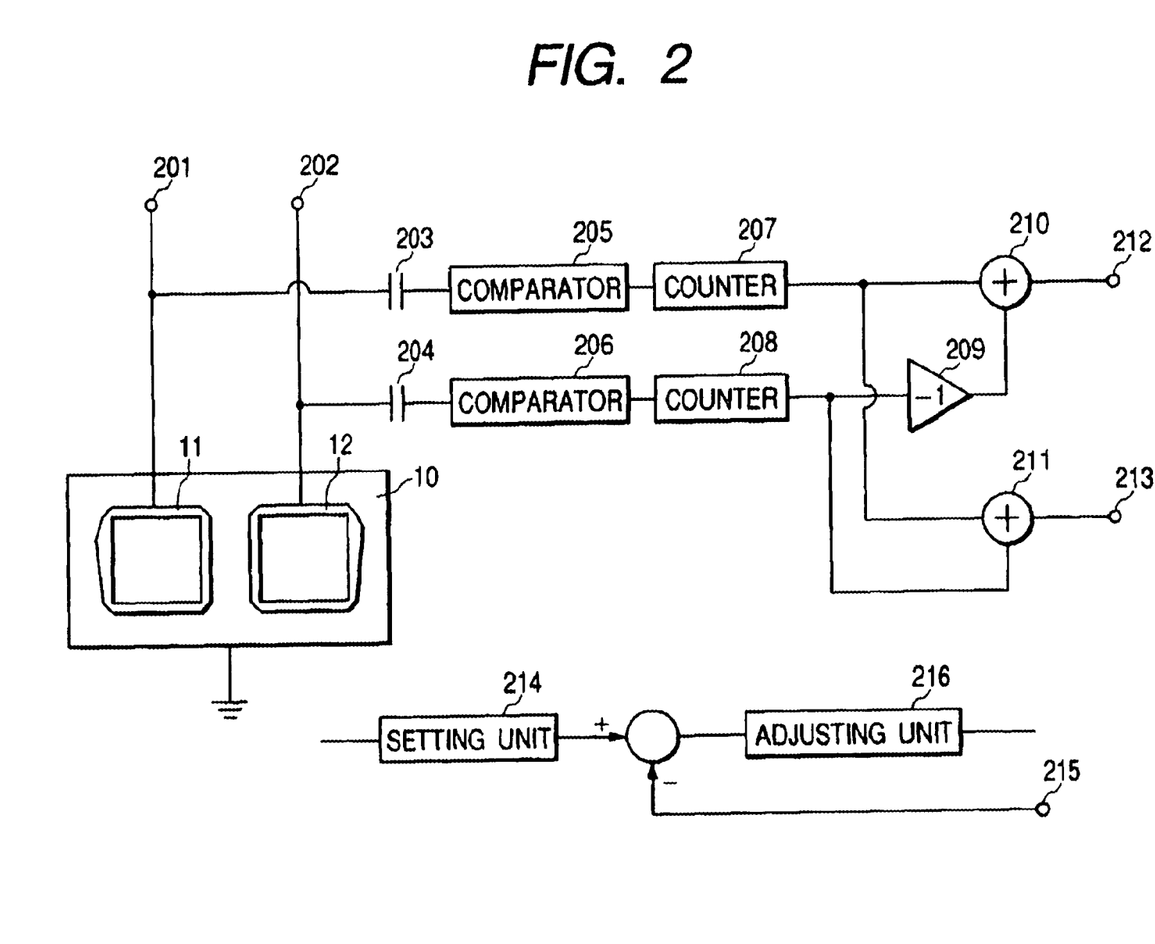
FIG. 2 is a circuit diagram illustrating the optical gyro, a drive circuit, and a signal processing circuit of Embodiment 1 according to the present invention.

In order to independently inject current into the semiconductor ring lasers 11 and 12 to detect terminal voltage, a circuit shown in FIG. 2 is used.

In FIG. 2, a reference numeral 10 denotes an optical gyro according to the present invention. Reference numerals 11 and 12 denote semiconductor ring lasers. Reference numerals 201 and 202 denote drive current input terminals, reference numerals 203 and 204 denote coupling capacitors, reference numerals 205 and 206 denote comparators, reference numerals 207 and 208 denote counters, a reference numeral 209 denotes a gain (-1) inverter, reference numerals 210 and 211 denote adders, a reference numeral 212 denotes a signal output terminal, and a reference numeral 213 denotes an error signal output terminal.

Each of the terminals 201 and 202 is driven at constant current, which is above an oscillation threshold current of the corresponding semiconductor ring laser. In the semiconductor ring laser 11 (and 12), a clockwise laser beam and a counterclockwise laser beam exist independently of each other.

The clockwise laser beam and the counterclockwise laser beam have different oscillation frequencies in a static state. This is caused by the asymmetrical tapered portion of the semiconductor ring laser 11 (and 12). The laser beam propagates in the ring cavity while total internal reflections take place the interface of the optical waveguide. Since, at the tapered portion, the angle of incidence upon the interface of the optical waveguide is smaller than the critical angle of the total internal reflection, waveguide loss is generated. Since the angle of incidence at the tapered portion differs according to the propagation direction, the loss depends on the propagation direction of the laser beam.

Difference in the loss according to the propagation direction of the laser beam leads to a difference in the oscillation threshold currents of the counterpropagating laser beams. When two laser beams simultaneously exist, the photon density of the two laser beams are different from each other due to nonlinear optical effect. The frequency $f_j$ and the photon density $S_j$ of the two laser beams (modes) have the following relationship, which clarifies that difference in the photon densities results in different oscillation frequencies:

$$2\pi f_1 + d\Phi_1/dt = \Omega + \delta_1 - \rho_1 S_1 - \tau_{12} S_2$$

$$2\pi f_2 + d\Phi_2/dt = \Omega + \delta_2 - \rho_2 S_2 - \tau_{21} S_1 \quad (1)$$

Where $\Phi_i$ is phase, $\Omega$ is a resonant angular frequency, $\delta_j$ is a mode pulling coefficient, $\rho_i$ is a self-mode-pushing₁ coefficient, and $\tau_{ij}$ is a cross-mode-pushing coefficient. It should be noted that i, j=1, 2; i=j. Since the frequencies $f_{10}$ and $f_{20}$ differ from each other in a static state, beat with a frequency of $f_0 = f_{20} - f_{10}$ is generated. The tapered shapes are designed so that the beat frequency in the static state may be 100 Hz or higher, preferably 1 kHz or higher, and more preferably, 10 kHz or higher.

Here, when the semiconductor ring laser is rotated clockwise at the angular velocity $\Omega$, the oscillation frequency of the first clockwise laser beam is smaller than the oscillation frequency $f_{10}$ by:

$$\Delta f_1 = 2S\Omega/(\lambda_1 L) \quad (2)$$

where S is an area surrounded by the optical path, L is the optical path length, and $\lambda_1$ is the wavelength in the medium of the clockwise laser beam. On the other hand, the oscillation frequency of the second counterclockwise laser beam is larger than the oscillation frequency $f_{20}$ by:

$$\Delta f_2 = 2S\Omega/(\lambda_2 L) \quad (3)$$

Where $\lambda_{two}$ is the wavelength in the medium of the counterclockwise laser beam.

Since the first clockwise laser beam and the second counterclockwise laser beam coexist in the ring resonator, beat is generated having the frequency difference between the first laser beam and the second laser beam. When the lasers are rotated, the frequency $\Delta f$ of the beat is expressed as:

$$\Delta f = f_2 - f_1$$

$$= f_{20} - f_{10} + (\Delta f_2 + \Delta f_1)$$

$$= f_{20} - f_{10} + (2S\Omega/L) \cdot (1/\lambda_2 + 1/\lambda_1) \quad (4)$$

The optical beat causes pulsation of population inversion with the same frequency $\Delta f$, which vary the impedance between the terminals. Therefore, in DC driving, voltage variation at the above frequency $\Delta f$ is observed between the terminals. It should be noted that since the observed frequency is always positive, $|\Delta f|$ is obtained.

Figure 3:
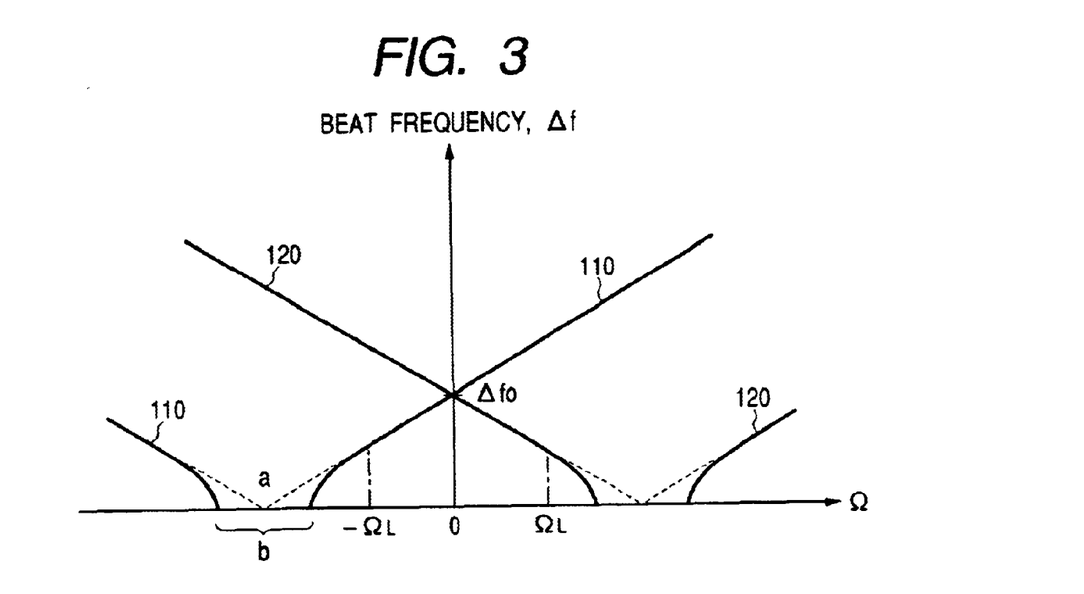
FIG. 3 is a graph illustrating the relationship between the frequency of a beat signal and an angular velocity in the optical gyro of Embodiment 1 according to the present invention.

As described above, when the oscillation frequencies $f_{10}$ and $f_{20}$ of the laser beams in the static state are different from each other, the beat $\Delta f = f_{20} - f_{10}$ is generated in the static state as illustrated in FIG. 3. As shown by straight lines portions in FIG. 3, the beat frequency is increased or decreased according to the rotational direction when the laser is rotated. In FIG. 3, a signal for $f_{20} - f_{10} > 0$ is shown by solid lines 110, while a signal for $f_{20} - f_{10} < 0$ is shown by solid lines 120.

The relationship between the frequency of a voltage signal and the angular velocity is now described with reference to FIG. 3.

In FIG. 3, the linear portions of the lines 110 and broken lines which are extensions of the lines 110, correspond to $\Delta f$ in Eq. (3). When the difference between the oscillation frequencies of the two laser beams equals to or is below a predetermined threshold value (shown as solid curves), the two laser beams are strongly coupled to each other, and there is no difference in the oscillation frequencies between the counterpropagating laser beams or only one mode oscillates, which these phenomena is referred to as lock-in (a region b).

In FIG. 3, the beat frequency in the static state is the same $(\Delta f_0 = |f_{20} - f_{10}|)$.

The relationship between the angular velocity and the frequency of the voltage signal of the semiconductor ring laser 11 and the relationship between the angular velocity and the frequency of the voltage signal of the semiconductor ring laser 12, which has mirror symmetry with the laser 11, are symmetrical to each other with respect to the angular velocity $\Omega$ under the same driving condition. Further, the beat frequency $\alpha f_0$ in the static state is the same.

In the signal processing circuit shown in FIG. 2, the angular velocity is detected as follows. Signals showing a voltage change are taken in from the respective semiconductor ring lasers through the capacitors 203 and 204. The signals are shaped so as to be rectangular waves by the comparators 205 and 206. The counters 207 and 208 count pulse numbers in a predetermined time.

Through the inverter 209, outputs from the counters 207 and 208 are added by the adder 210.

More specifically, the difference between the beat frequencies of the two semiconductor ring lasers is obtained. When the two semiconductor ring lasers are under the same driving conditions, or, as described in the following, when the driving conditions are controlled so that the beat frequencies in the static state may be the same, the difference $f_-$ between the beat frequencies of the two semiconductor ring lasers is in proportion to the angular velocity and is expressed as:

$$f_- = (2S\Omega/L) \cdot (1/\lambda_{1,CW} + 1/\lambda_{1,CCW} + 1/\lambda_{2,CW} + 1/\lambda_{2,CCW}) \quad (5)$$

Where $\lambda_{j,CW}$ and $\lambda_{j,CCW}$ (j=1, 2) are oscillation wavelength of the clockwise and counterclockwise laser beams, respectively, in the j-th semiconductor ring laser, and are substantially equal to each other.

In this way, the signal output 212, which is in proportion to the angular velocity including the sign representing the rotational direction, is obtained.

It should noted that the range where the signal is in proportion to the angular velocity is where $-\Omega_L < \Omega < \Omega_L$ shown in FIG. 3, wherein $\Omega_L$ is an angular velocity where the linear relationship shown in FIG. 3 can not be maintained due to lock-in. When $\Omega_L < \Omega$, the angular velocity can be detected from the signal from the ring laser which follows the solid line 110 in FIG. 3, while, when $\Omega < -\Omega_L$, the angular velocity can be detected from the signal from the ring laser which follows the solid line 120 in FIG. 3.

The adder 211 adds the outputs from the counters 207 and 208. More specifically, the sum $f_+$ of the beat frequencies of the two semiconductor ring lasers, which is independent of the angular velocity, and is expressed as:

$$f_+ = \Delta f_{01} + \Delta f_{02} \quad (6)$$

where $\Delta f_{0j}$ is beat frequency in the static state in the j-th semiconductor ring laser. When this value varies, the beat frequency in the static state in at least one of the two semiconductor ring lasers is varied, and thus, the detection of the angular velocity according to Eq. (5) includes error.

Therefore, this amount is used as an error signal of the driving current for a feedback control circuit. More specifically, as an error signal 215 for a value predetermined by a setting unit 214 (an initial value of $f_+$ which corresponds to two times as high as the beat frequency in the static state), a signal 213, which is the sum of the beat frequencies, is used. According to this, in an adjusting unit 216, the driving current of the semiconductor ring lasers is controlled.

There is a tendency that, as the driving current of the semiconductor ring lasers increases from the threshold, the difference in the light intensities between the two modes also increases and the beat frequency in the static state becomes higher expressed in Eq. (1). Therefore, feedback control is carried out so that the drive current may decrease when the beat frequency in the static state increases and so that the drive current may increase when the beat frequency in the static state decreases.

As described above, in the signal processing, by using the difference between the beat frequencies, a signal in proportion to the angular velocity including the sign representing the rotational direction is obtained without using the beat frequency in the static state as a reference. Further, at the same time, feedback control to stabilize the beat frequency in the static state results in excellent optical gyro in stability.

Though the InGaAsP/InP semiconductor material is used in the present embodiment, the material may be of the GaAs, the ZnSe, the InGaN or the like where laser oscillation takes place by injecting current. Further, though a feedback control system of the driving current is described, the beat frequency in the static state may be stabilized by feedback control of a temperature, too. In this case, there is a tendency that decrease in the threshold current of the device by lowering the temperature of the device results in greater difference in the light intensity between the two modes, which leads to higher beat frequency in the static state. Therefore, feedback control is carried out so that the temperature of the device may be raised when the beat frequency in the static state increases and so that the temperature of the device may be lowered when the beat frequency in the static state decreases.

Figure 9:
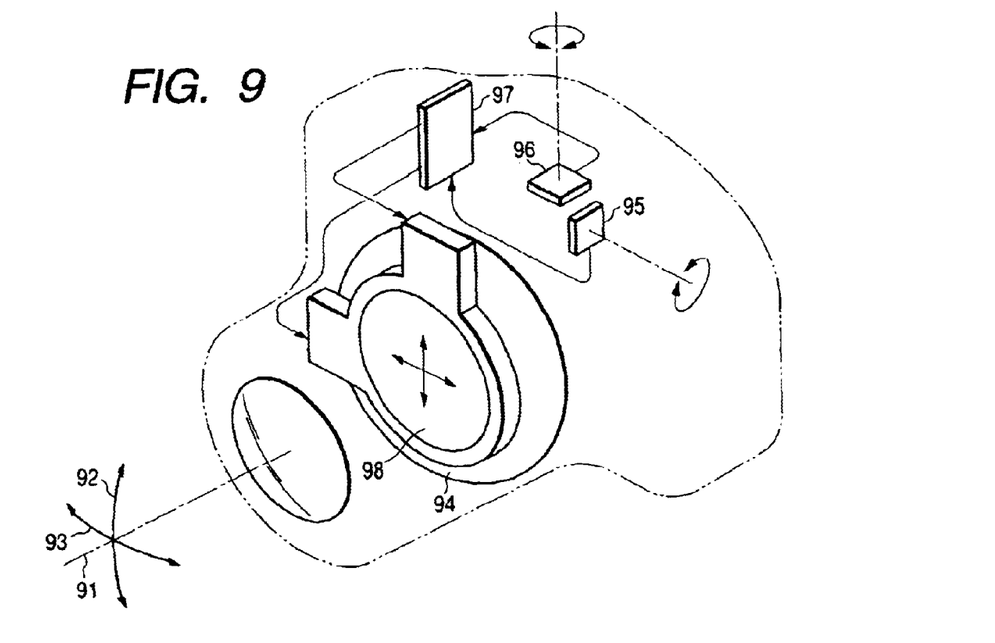
FIG. 9 is a conceptual view of a camera which prevents blurred image by detecting movement of the camera using the optical gyro of Embodiment 1 according to the present invention.

FIG. 9 illustrates a compact camera having a system for preventing blurred image using the gyro of the present embodiment. This camera has a function to compensate for vertical movement and horizontal movement of the camera shown as arrows 92 and 93, respectively, with respect to an optical axis 91. A reference numeral 94 denotes a compensation means. Reference numerals 95 and 96 denote rotation detecting devices where the gyro of the present embodiment and a drive circuit are accommodated in one package, a reference numeral 97 denotes a microcomputer for the camera, and a reference numeral 98 denotes a correcting lens.

Output signals from the rotation detecting devices 95 and 96 correspond to the angular velocities of pitch and yaw of the camera, respectively. These signals are inputted to the microcomputer 97 for the camera. When a release button of the camera is completely pressed down, the microcomputer 97 sends driving signals to the compensation means 94 for the focal length and the distance to an object according to the signals. According to the driving signals, the compensation means 94 moves the correcting lens 98 in the directions of two axes in a plane perpendicular to the optical axis to correct the rotation, and prevents blurred image due to rotation of the camera.

Since the rotation detecting device consisting of the gyro of the present embodiment is small in size and consumes low power, a tiny system for preventing blurred image suitable for a compact camera can be structured.

Embodiment 2

Figure 4:
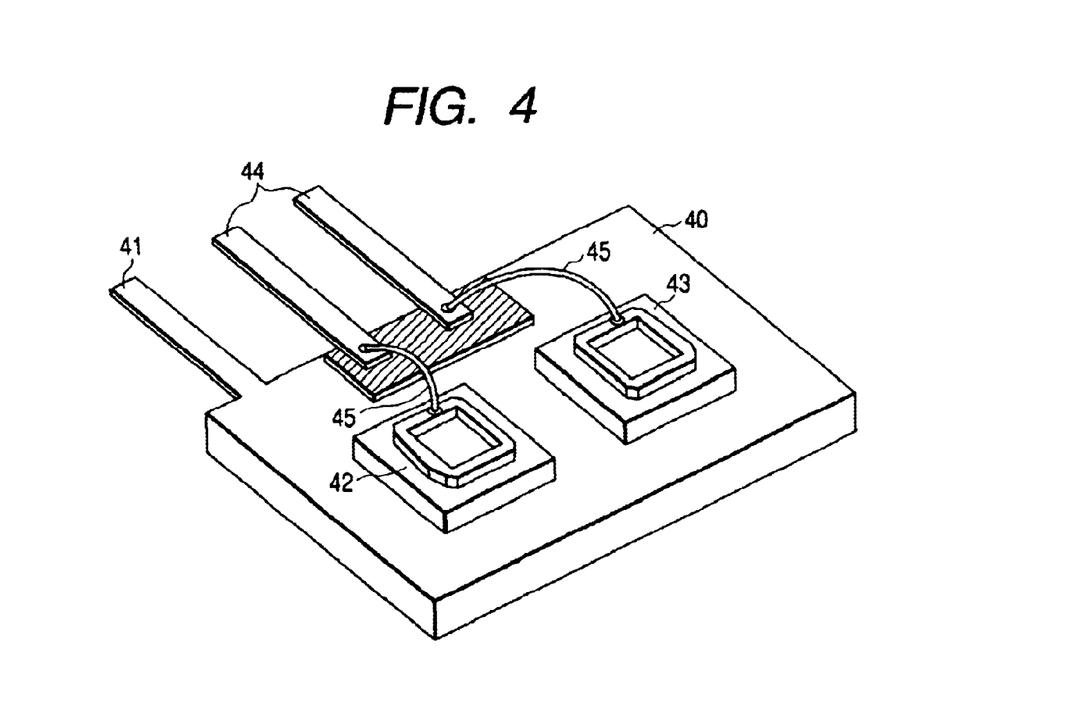
FIG. 4 is a perspective view of an optical gyro of Embodiment 2 according to the present invention.
Figure 5:
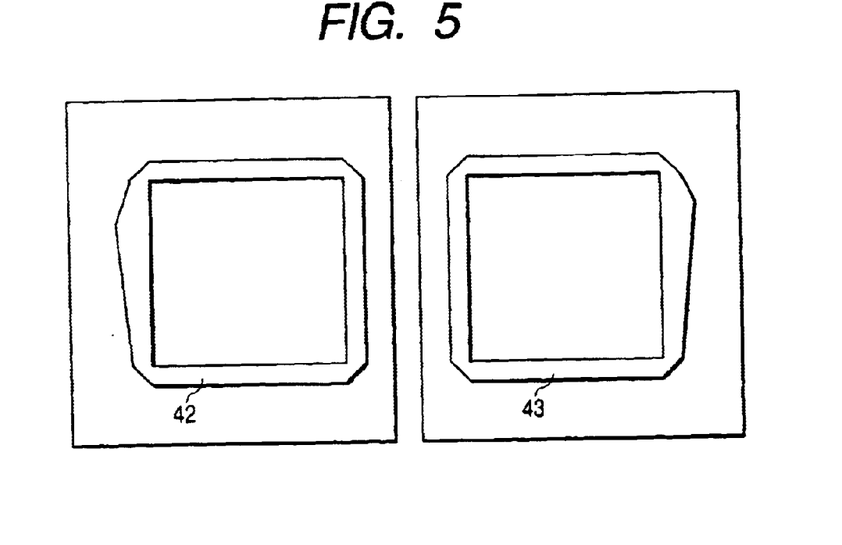
FIG. 5 is a plan view of the optical gyro of Embodiment 2 according to the present invention.

FIG. 4 is a perspective view of another optical gyro according to the present invention, and illustrates a case where multiple semiconductor ring lasers are provided in one housing.

In FIG. 4, a common electrode 41 is connected to a stem 40 used as a housing. Electrodes 44 are connected to the semiconductor ring lasers 42 and 43, respectively via wires 45. Here, the structure of layers in the semiconductor ring lasers 42 and 43 are the same as that of the semiconductor ring lasers described in Embodiment 1. Each of the semiconductor ring lasers 42 and 43 has a tapered portion formed of a first portion where the width of the optical waveguide becomes larger along the propagation direction of a clockwise laser beam and a second portion where the width of the optical waveguide becomes smaller. The optical path length is the same between the semiconductor ring lasers 42 and 43, and the semiconductor ring lasers 42 and 43 have mirror symmetry each other.

In the above structure, the substrates of the semiconductor ring lasers 42 and 43, are individually soldered to the stem 41, and function as the common electrodes. Electrodes on the cap layer of the semiconductor ring lasers 42 and 43 are connected through the wires 45 to the individual electrodes 44, respectively.

While current is injected, variation in the voltage between the electrodes is detected. For current injection and voltage detection using the same electrodes, a circuit shown in FIG. 6 is used here.

Figure 6:
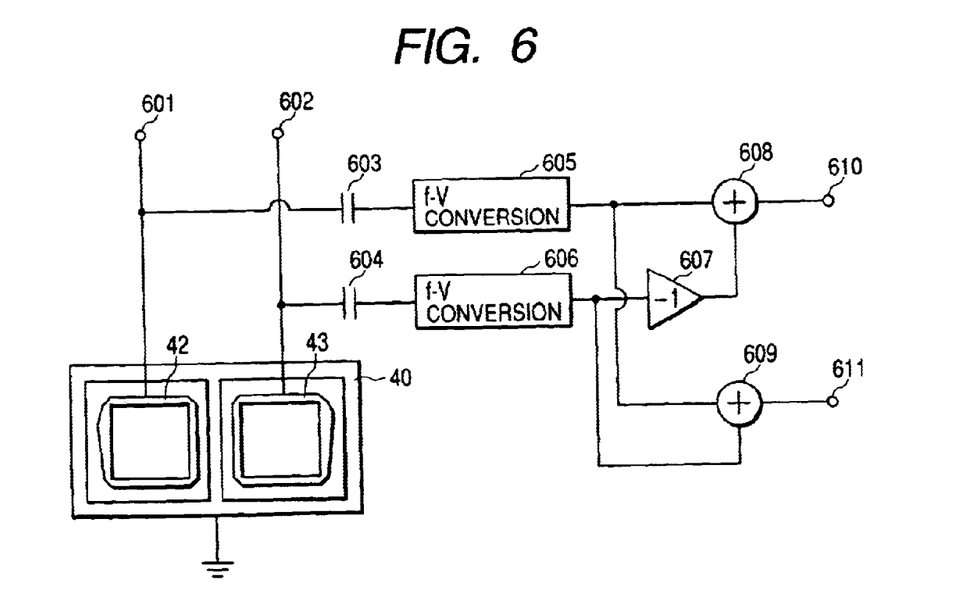
FIG. 6 is a circuit diagram illustrating the optical gyro, a drive circuit, and a signal processing circuit of Embodiment 2 according to the present invention.

In FIG. 6, a reference numeral 40 denotes the optical gyro device according to the present invention. Reference numerals 42 and 43 denote the semiconductor ring lasers. Reference numerals 601 and 602 denote drive current input terminals, reference numerals 603 and 604 denote coupling capacitors, reference numerals 605 and 606 denote f-V conversion circuits, a reference numeral 607 denotes a gain (−1) inverter, reference numerals 608 and 609 denote adders, a reference numeral 610 denotes a signal output terminal, and a reference numeral 611 denotes an error signal output terminal.

From each of the terminals 601 and 602, the semiconductor ring lasers 42 and 43 are driven at DC current which is above an oscillation threshold current of the semiconductor ring lasers. In each of the semiconductor ring lasers 42 and 43, a clockwise laser beam and a counterclockwise laser beam exist independently of each other, and a beat signal is generated. The relationship between the angular velocity and the beat signal is similar to the one illustrated in FIG. 3.

In the signal processing circuit shown in FIG. 6, the angular velocity is detected as follows. Signals showing voltage variation are taken in from the respective semiconductor ring lasers through the capacitors 603 and 604. Voltages according to the frequencies of the beat signals are taken out by the f-V conversion circuits 605 and 606. Through the inverter 607, outputs from the f-V conversion circuits 605 and 606 are added by the adder 608. More specifically, the difference between the beat frequencies of the two semiconductor ring lasers is obtained. Similarly to the case of Embodiment 1, when the two semiconductor ring lasers are driven under substantially the same drive conditions so that the beat frequencies in the static state may be the same, a signal output 610 in proportion to the angular velocity including the sign representing the rotational direction is obtained.

The adder 609 adds the outputs from the two f-V conversion circuits 605 and 606. More specifically, output corresponding to the sum of the beat frequencies of the two semiconductor ring lasers is obtained. Similarly to the case of Embodiment 1, this amount is a constant value independent of the angular velocity, and is an amount corresponding to the sum of the beat frequencies when the two semiconductor ring lasers are in the static state. Therefore, this amount is taken out as an error signal 611, which is used for adjusting driving current of the semiconductor ring lasers in a feedback control circuit. Similarly to the case of Embodiment 1, control is carried out so that the driving current may decrease when the beat frequency in the static state increases and so that the driving current may increase when the beat frequency in the static state decreases.

A housing according to the present invention may be of any shape, for example, hybrid mounting of multiple semiconductor ring lasers can be carried out. Though rectangular ring resonators for the semiconductor ring lasers in the two embodiments are described in the above, circular ones, triangular ones, and the like which form closed paths may also be applied.

Embodiment 3

Figure 7:
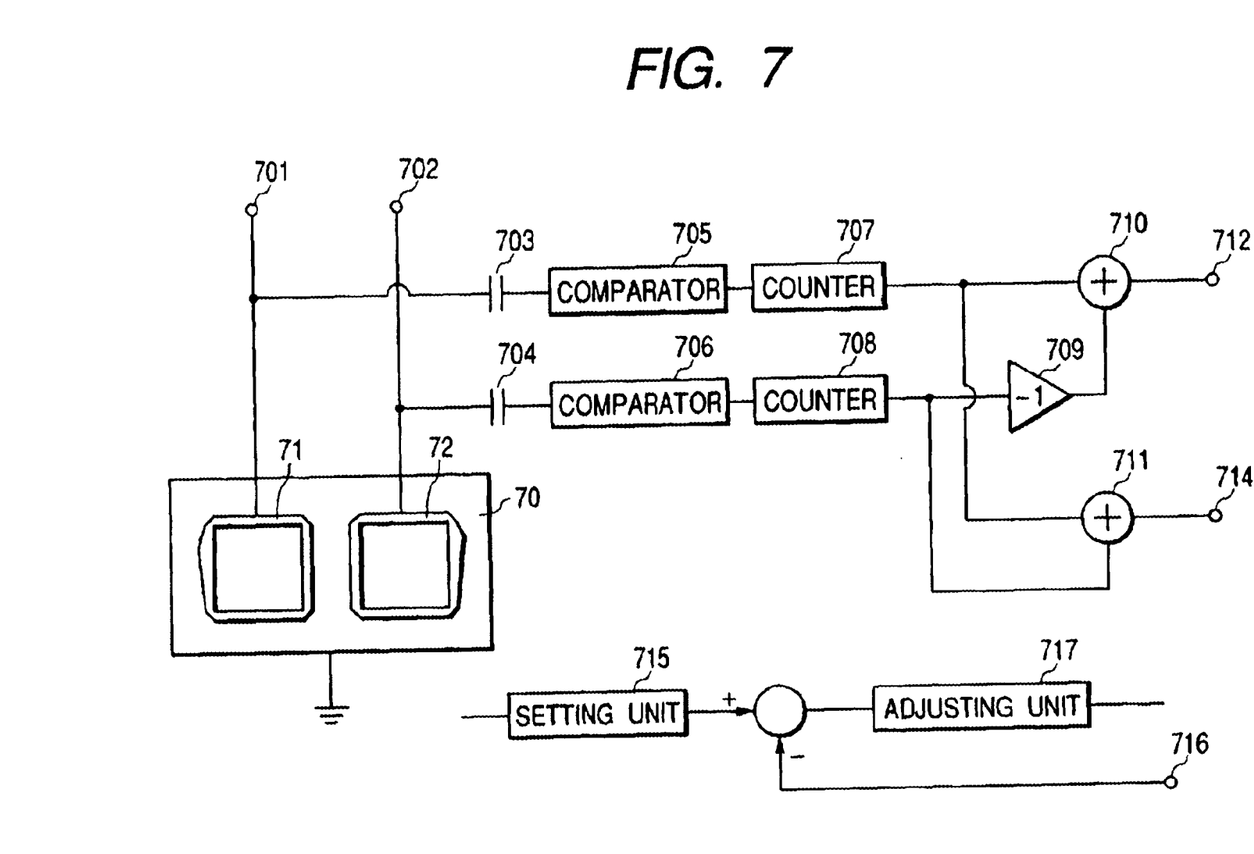
FIG. 7 is a circuit diagram illustrating an optical gyro, a drive circuit, and a signal processing circuit of Embodiment 3 according to the present invention.

FIG. 7 shows another method of driving and signal processing of an optical gyro according to the present invention.

In FIG. 7, a reference numeral 70 denotes an optical gyro according to the present invention. Reference numerals 71 and 72 denote semiconductor ring lasers. Reference numerals 701 and 702 denote driving current input terminals, reference numerals 703 and 704 denote coupling capacitors, reference numerals 705 and 706 denote comparators, reference numerals 707 and 708 denote counters, a reference numeral 709 denotes a gain (−1) inverter, reference numerals 710 and 711 denote adders, a reference numeral 712 denotes a circuit for removing offset in a static state, a reference numeral 713 denotes a signal output terminal, and a reference numeral 714 denotes an error signal output terminal. Reference numerals 715, 716, and 717 denote a setting unit of injected current, an input terminal of an error signal to a current control block, and an adjusting unit of the injected current, respectively.

The optical gyro is the one described in Embodiment 1. Each of the terminals 701 and 702 is driven at DC current which is above an oscillation threshold current of the corresponding semiconductor ring laser 71 or 72. It should be noted that the injected current of the semiconductor ring laser 71 is different from that of the semiconductor ring laser 72. In the semiconductor ring laser 71 (and 72), a clockwise laser beam and a counterclockwise laser beam exist independently of each other. As described in the above, due to the tapered portions, the clockwise laser beam and the counterclockwise laser beam have different oscillation frequencies and therefore, a beat signal is generated even in the static state. By the way, as shown in Eq. (1), the frequency of the beat signal depends on the difference in the light intensities of the two laser beams having different rotational directions. Therefore, between the two semiconductor ring lasers having different injected current, the beat frequency in the static state also differs, because the intensities of the clockwise and counterclockwise laser beams are also different from each other.

Figure 8:
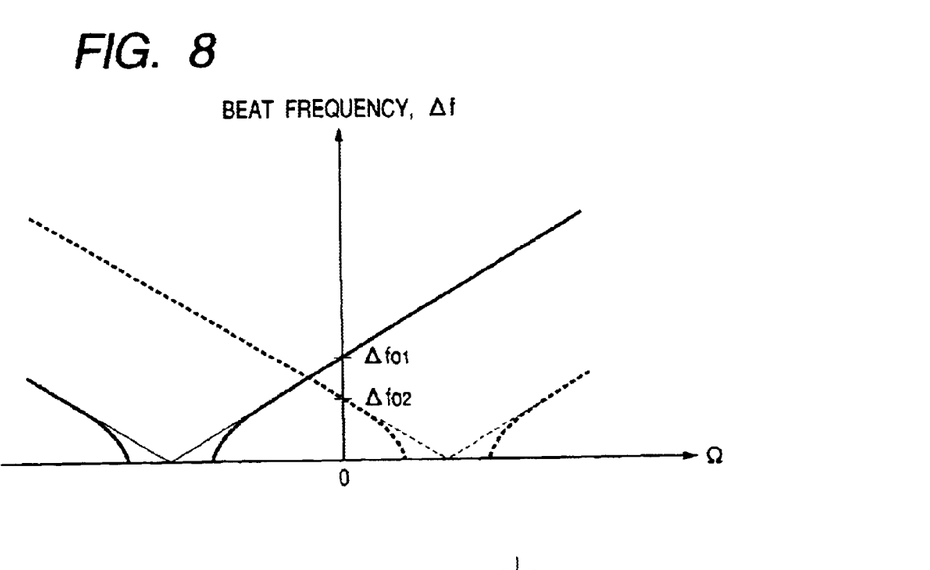
FIG. 8 is a graph illustrating the relationship between the frequency of a beat signal and an angular velocity in the optical gyro of Embodiment 3 according to the present invention.

Next, the relationship between the rotational angular velocity $\Omega$ and the beat frequency $\Delta f$ is illustrated in FIG. 8. Solid lines and broken lines denote characteristics of the semiconductor ring lasers 71 and 72, respectively. As shown in Eq. (4), the absolute value of the slope of the beat frequency with respect to the angular velocity is $(1/\lambda_{CW}+1/\lambda_{j,CCW})S/L$. When the two lasers have substantially the same wavelengths and the same S/L, the two lasers also have substantially the same absolute value of the slope.

Signals showing a voltage change are taken in from the semiconductor ring lasers 71 and 72 through the capacitors 703 and 704. The signals are shaped so as to be rectangular waves by the comparators 705 and 706. The counters 707 and 708 count pulse numbers in a predetermined time. Through the inverting amplifier 709 having a gain $(-\Delta f_{01}/\Delta f_{02})$, outputs from the counters 707 and 708 are added by the adder 710. More specifically, as a negatively weighted sum of the beat frequencies of the two semiconductor ring lasers, a signal output 712 in direct proportion to the angular velocity is obtained.

As in of Embodiment 1, the adder 711 adds the outputs from the counters 707 and 708. More specifically, the sum of the beat frequencies of the two semiconductor ring lasers is obtained. Therefore, as in of Embodiment 1, when this amount varies, the beat frequency in the static state in at least one of the two semiconductor ring lasers is varied. This amount is taken out as an error signal 714, and is returned to a feedback control circuit of driving current. More specifically, as an error signal 716 for a value predetermined by a setting unit 715 (corresponding to the sum of the beat frequencies in the static state $(\Delta f_{01}+\Delta f_{02})$, a signal 714, which is the sum of the beat frequencies, is used to adjust the driving current of the semiconductor ring lasers in an adjusting unit 717.

As described above, by a signal processing using beat frequencies from two lasers, a signal in proportion to the angular velocity including the sign representing the rotational direction is obtained. Further, at the same time, feedback control to stabilize the beat frequency in the static state results in excellent optical gyros in stability.

In the three embodiments described in the above, the optical gyros are driven by DC current and voltage changes between terminals according to the angular velocity of the optical gyros are detected. As is clear from the principle of measurement, a change in the device impedance or a change in the current when driven by DC voltage due to the angular velocity of the device is detected.

As described above, according to the present invention, an optical gyro which detects the angular velocity and the rotational direction with accuracy is obtained.

Further, according to the present invention, an optical gyro, which is easily fabricated and detects the angular velocity and the rotational direction with accuracy, is obtained.

Further, according to the present invention, an optical gyro, which has two semiconductor ring lasers optically independent of each other and stably operates, is obtained.

Further, according to the present invention, since a change in the impedance of a device can be observed with a simple circuit, which can be easily connected to various kinds of signal processing circuits, a method of driving an optical gyro which can detect the angular velocity and the rotational direction with accuracy is obtained.

Further, according to the present invention, a method of driving an optical gyro, which can process a signal with ease and accuracy, is obtained.

Further, according to the present invention, a method of processing a signal of an optical gyro, which can detect the angular velocity and the rotational direction with accuracy, is obtained.

Further, according to the present invention, a method of driving an optical gyro, which suppresses variation in an output signal due to a cause other than a change in the angular velocity and can detects the angular velocity of the rotation and the rotational direction with accuracy, is obtained.

What is claimed is:

1. A ring laser gyro comprising:
   a plurality of semiconductor ring lasers including at least first and second semiconductor ring lasers, said first and second semiconductor ring lasers being optically independent of each other, and each of said first and second semiconductor ring lasers having counterpropagating laser beams which generate a beat frequency in response to angular velocity;
   wherein a change in beat frequency with respect to a change in angular velocity of said first semiconductor ring laser is opposite to that of said second semiconductor ring laser, and
   wherein angular velocity of rotation of said ring laser gyro is detected using a signal representing a difference between a first beat frequency generated by said first semiconductor ring laser and a second beat frequency generated by said second semiconductor ring laser.

2. A ring laser gyro according to claim 1, wherein said beat frequency generated by said first semiconductor ring laser and said beat frequency generated by said second semiconductor ring laser in a static state are equal to each other, and the rate of said change in said beat frequency with respect to said change in said angular velocity of said first semiconductor ring laser is equal to that of said second semiconductor ring laser.

3. A ring laser gyro according to claim 1, wherein, when angular velocity in a direction is increased, frequency of an impedance change with respect to said first semiconductor ring laser is decreased, while frequency of an impedance change with respect to said second semiconductor ring laser is increased.

4. A ring laser gyro according to claim 1, wherein said first and second semiconductor ring lasers each have optical waveguides with a tapered portion therein,
   wherein said tapered portion is formed of a first portion where width of said optical waveguide becomes larger along a propagation direction of a clockwise laser beam and a second portion where width of said optical waveguide becomes smaller and,
   wherein in said first semiconductor ring laser, said first portion is longer than said second portion, while, in said second semiconductor ring laser, said second portion is longer than said first portion.

5. A ring laser gyro according to any one of claims 1 to 4, wherein a ratio of an area surrounded by a resonator to the length of a revolution of said resonator in said first semiconductor ring laser is equal to that in said second semiconductor ring laser.

6. A ring laser gyro according to claim 1, wherein shapes of resonators of said first semiconductor ring laser and second semiconductor ring laser are mirror images of each other.

7. A ring laser gyro according to claim 1, wherein said first and second semiconductor ring lasers are oriented on parallel planes nonperpendicular to each other.

8. A ring laser gyro according to claim 7, wherein said first and second semiconductor ring lasers are oriented on one plane.

9. A ring laser gyro according to claim 1, further comprising a substrate, wherein each of said first and second semiconductor ring lasers are formed on said substrate, and said substrate is a semiconductor substrate.

10. A ring laser gyro according to claim 1, further comprising a light-shield for preventing optical coupling between said first and second semiconductor ring lasers;
    wherein said light-shield does not return reflected light to said first and second semiconductor ring lasers.

11. A method of driving a ring laser gyro comprising:
    operating a plurality of semiconductor ring lasers, including at least first and second semiconductor ring lasers, at constant current, said first and second semiconductor ring lasers being optically independent from each other, and each of said first and second ring lasers having counterpropagating laser beams which generate a beat frequency in response to angular velocity, wherein a change in beat frequency with respect to a change in angular velocity of said first semiconductor ring laser is opposite to that of said second semiconductor ring laser, wherein an angular velocity of rotation of said ring laser gyro is detected by a signal representing a difference between a first beat frequency generated by said first semiconductor ring laser and a second beat frequency generated by a second semiconductor ring laser; and
    detecting a voltage change at electric terminals which are connected to each of said first and second semiconductor ring lasers.

12. A method of driving a ring laser gyro comprising:
    operating a plurality of semiconductor ring lasers, including at least first and second semiconductor ring lasers, at constant voltage, said first and second semiconductor ring lasers being optically independent from each other, and each of said first and second ring lasers having counterpropagating laser beams which generate a beat frequency in response to angular velocity, wherein a change in beat frequency with respect to a change in angular velocity of said first semiconductor ring laser is opposite to that of said second semiconductor ring laser, wherein an angular velocity of rotation of said ring laser gyro is detected by a signal representing a difference between a first beat frequency generated by said first semiconductor ring laser and a second beat frequency generated by a second semiconductor ring laser; and
    detecting a drive current change at electric terminals which are connected to each of said first and second semiconductor ring lasers.

13. A method of driving a ring laser gyro according to claim 11 or 12, wherein current injected to or voltage applied to said first and second semiconductor ring lasers is the same.

14. A method of processing a signal from a ring laser gyro comprising:
    operating a plurality of semiconductor ring lasers, including at least first and second semiconductor ring lasers, said first and second semiconductor ring lasers being optically independent from each other, and each of said first and second ring lasers having counterpropagating laser beams which generate a beat frequency in response to angular velocity, wherein a change in beat frequency with respect to a change in angular velocity of said first semiconductor ring laser is opposite to that of said second semiconductor ring laser, wherein an angular velocity of rotation of said ring laser gyro is detected by a signal representing a difference between a first beat frequency generated by said first semiconductor ring laser and a second beat frequency generated by a second semiconductor ring laser; and detecting angular velocity and rotational direction of said ring laser gyro on the basis of an impedance change in said first and second semiconductor ring lasers.

15. A method of processing a signal from a ring laser gyro according to claim 14, wherein said step of detecting angular velocity and rotational direction of said ring laser gyro uses subtraction or negatively weighted average operations.

16. A method of processing a signal from a ring laser gyro according to claim 15, wherein a weight corresponding to a ratio of the beat frequencies in said plurality of semiconductor ring lasers in a static state, is used in a negatively weighted average operation.

17. A method of processing a signal from a ring laser gyro according to claim 15, further comprising:

calculating angular velocity and rotational direction of said ring laser gyro on the basis of an impedance change in said plurality of semiconductor ring lasers; and controlling drive conditions based on said calculated angular velocity and rotation direction.

18. A method of processing a signal from a ring laser gyro according to claim 17, wherein said step of calculating angular velocity and rotational direction of said ring laser gyro uses addition or weighted average operations.

19. A method of processing a signal from a ring laser gyro according to claim 18, wherein a weight corresponding to a ratio of length of a revolution of each of said semiconductor ring lasers to area surrounded by each of said plurality of semiconductor ring lasers, is used in a weighted average operation.

* * * * *

UNITED STATES PATENT AND TRADEMARK OFFICE
CERTIFICATE OF CORRECTION

PATENT NO. : 6,785,003 B2
DATED : August 31, 2004
INVENTOR(S) : Natsuhiro Mizutani et al.

It is certified that error appears in the above-identified patent and that said Letters Patent is hereby corrected as shown below:

Column 10,
Line 33, "$\propto f_0$" should read -- $\Delta f_0$ --.

Signed and Sealed this

Tenth Day of January, 2006

JON W. DUDAS
*Director of the United States Patent and Trademark Office*